(12) United States Patent
Ide (10) Patent No.: US 8,873,262 B2
(45) Date of Patent: Oct. 28, 2014

(54) INVERTER DRIVING SYSTEM

(76) Inventor: Osamu Ide, Tokyo (JP)

( * ) Notice: Subject to any disclaimer, the term of this patent is extended or adjusted under 35 U.S.C. 154(b) by 102 days.

(21) Appl. No.: 13/635,329

(22) PCT Filed: Jul. 15, 2011

(86) PCT No.: PCT/JP2011/066233
§ 371 (c)(1),
(2), (4) Date: Sep. 14, 2012

(87) PCT Pub. No.: WO2012/008575
PCT Pub. Date: Jan. 19, 2012

(65) Prior Publication Data
US 2013/0100721 A1  Apr. 25, 2013

(30) Foreign Application Priority Data
Jul. 15, 2010  (JP) ................................ 2010-160821

(51) Int. Cl.
*H02M 7/48* (2006.01)
(52) U.S. Cl.
USPC ............................................ 363/131; 363/97
(58) Field of Classification Search
USPC ............................................ 363/95, 97, 131
See application file for complete search history.

(56) References Cited

U.S. PATENT DOCUMENTS 6,867,986 B2 *  3/2005  Amei ............................ 363/21.01
7,834,561 B2 * 11/2010  Fong et al. .................... 315/307

FOREIGN PATENT DOCUMENTS

| JP | 03-163799   | 11/1989 |
| JP | 200352173   | 2/2003  |
| JP | 2003133095  | 5/2003  |
| JP | 2007027009  | 2/2007  |
| JP | 2010-16009  | 2/2008  |
| JP | 2009303311  | 12/2009 |

OTHER PUBLICATIONS

World Intellectual Property Organization, International Preliminary Report on Patentability for Appln. No. JP2011/066233 Nov. 16, 2013.
Japanese Patent Office, Patent Abstracts of Japan for Japanese Patent Publication No. 2010-16009, Feb. 7, 2008.
Japanese Patent Office, Patent Abstracts of Japan for Japanese Patent Publication No. 03-163799, Nov. 20, 1989.
World Intellectual Property Organization, International Search Report for PCT Appln. No. JP2011/066233 Oct. 11, 2011.
Ide, Osamu, Possibility of Existence of Non-Linear Electromotive Force (EMF), Fifth International Symposium on Magnetic Suspension Technology, Jun. 2000, p. 29-43, NASA/CP-2000-210291, Langley Research Center, Hampton, Virginia, USA.
Ide, Osamu, Increased voltage phenomenon in a resonance circuit of unconventional magnetic configuration, Journal of Applied Physics, Jun. 1, 1995, p. 7-12, vol. 77, No. 11, American Institute of Physics.
Japanese Patent Office, Patent Abstracts of Japan for Japanese Patent publication No. 2007-027009, Feb. 1, 2007.

* cited by examiner

*Primary Examiner* — Jessica Han (57) ABSTRACT

Provided is an efficient inverter driving method. A pulse with very short pulse width is supplied as a primary driving pulse of a transformer, and the secondary output voltage of the transformer caused by a transient phenomenon can be enlarged several times while keeping the power source voltage for input current constant by shortening the time interval of the primary driving pulse.

6 Claims, 9 Drawing Sheets

INVERTER DRIVING SYSTEM

FIELD OF THE INVENTION

The present invention relates to a high-efficiency inverter driving system.

BACKGROUND OF THE INVENTION

Figure 8:
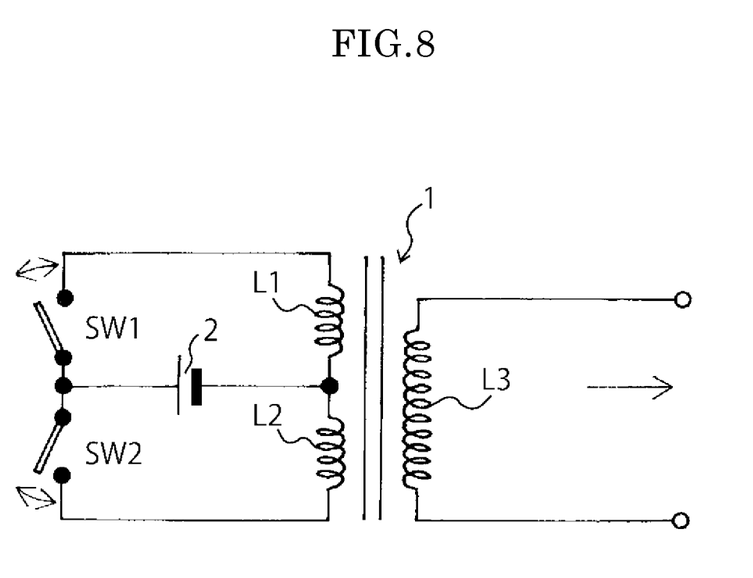
FIG. 8 is a circuit diagram illustrating an example of the basic circuit of Royer's circuit.

Conventionally, a typical driving system of inverter is a Royer's circuit (for example, see the patent literature 1). FIG. 8 shows an example of the basic circuit of Royer's circuit.

In FIG. 8, a transformer 1 has two primary windings $L_1$, $L_2$ and a single secondary winding $L_3$, and a negative electrode of DC power source 2 is connected to a mutually connected end of the primary windings $L_1$, $L_2$, and a positive electrode of DC power source 2 is connected to the other end of the primary winding $L_1$ via a switch SW1 while being connected to the other end of the primary winding $L_2$ via a switch SW2.

Figure 9:
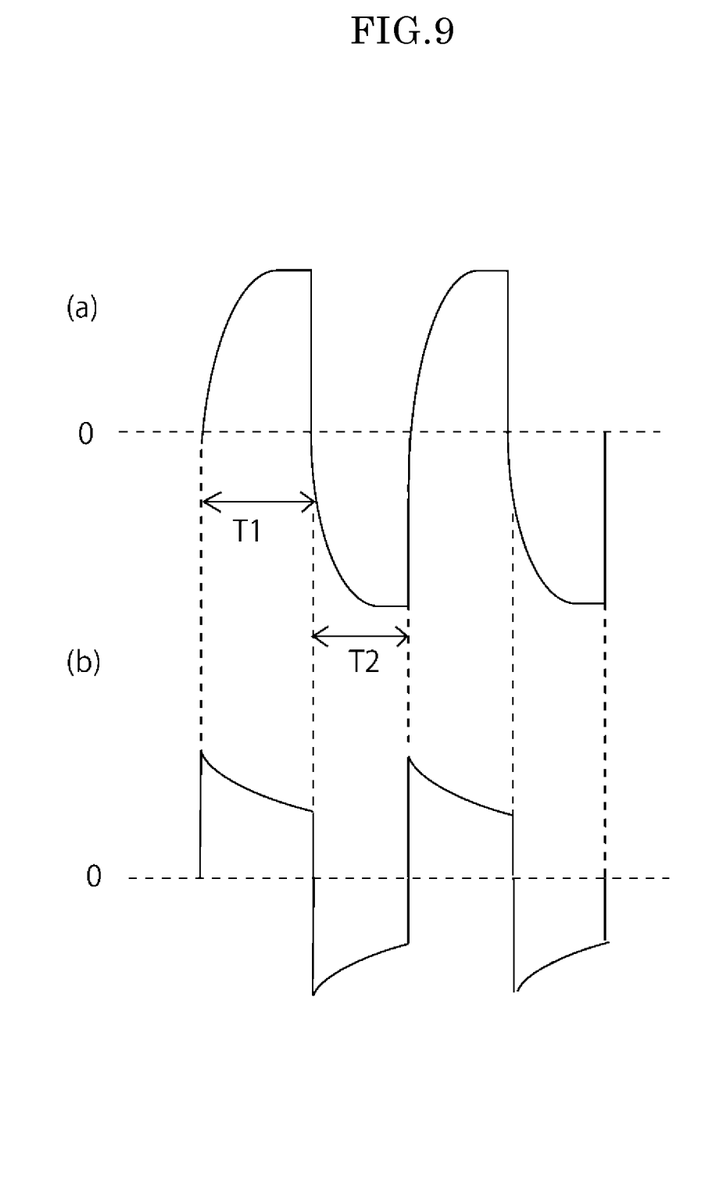
FIG. 9 is a waveform chart illustrating an example of the driving system of the circuit shown in FIG. 8.

As shown in FIG. 9(a), the switch SW1 and the switch SW2, both of which are initially turned off, are alternately turned on and off during the time T1, T2, allowing to alternately flow positive and negative input current in the primary windings $L_1$, $L_2$ of transformer 1, whereby an output signal as shown in FIG. 9(b) can be obtained in the secondary winding $L_3$ of transformer 1.

According to the driving system of this Royer's circuit, even if the input current may instantaneously become zero during operation, the operation of circuit is not completely suspended.

Figure 10:
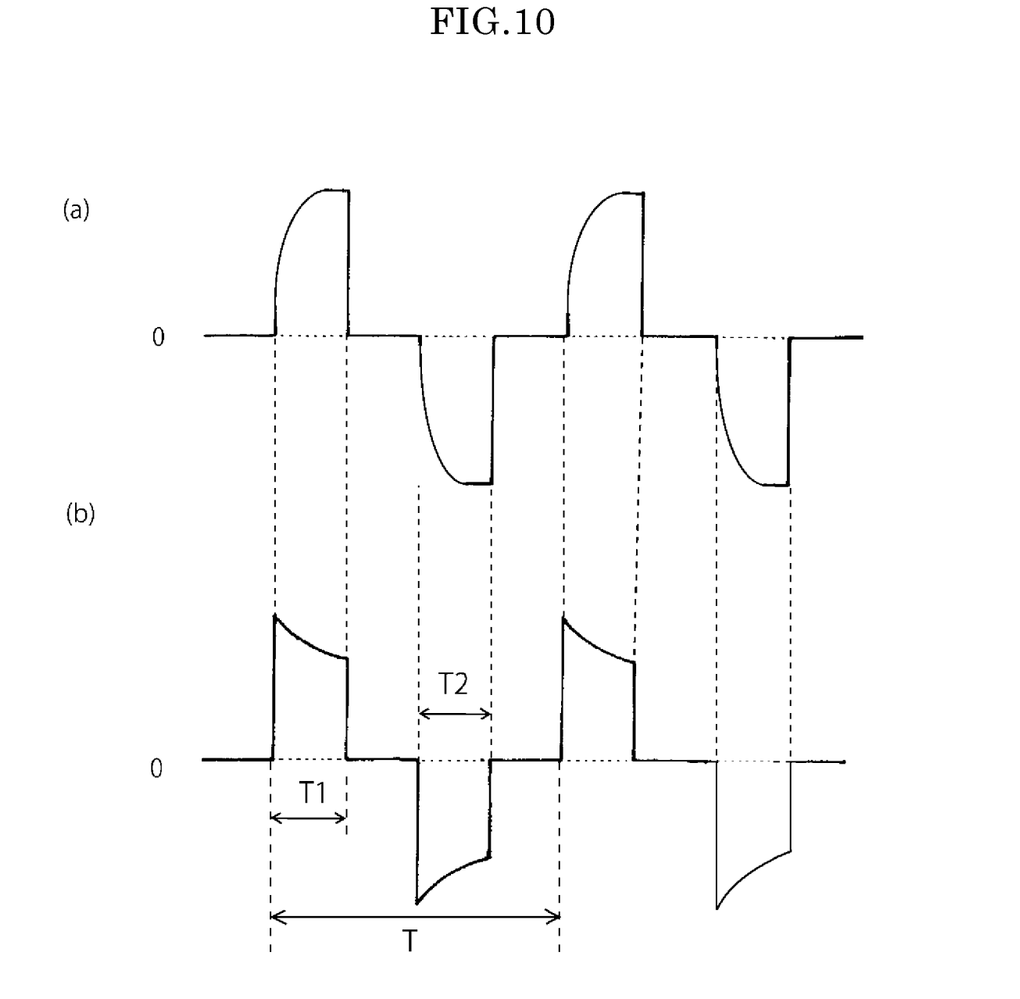
FIG. 10 is a waveform chart illustrating an operation when the circuit shown in FIG. 8 is driven by PWM.

Further, another typical driving system of inverter is PWM (Pulse Width Modulation) (see FIGS. 10(a), 10(b)). This is a system in which the pulse widths T1, T2 of input current in the cycle T of on-and-off operations of switches SW1, SW2 is adjusted to allow the intermittent driving of circuit, whereby the secondary output voltage is controlled.

That is, the pulse width of the secondary output voltage is changed by adjusting T1 and T2 which are on-time of the switches SW1 and SW2 in FIG. 8, thereby adjusting an effective output voltage. Thus, if the input current of transformer 1 is within the range of increasing in proportion to the time T1, T2 and the magnetic field of transformer 1 is within the range of saturation, the longer the time T1, T2 (that is, the higher the duty), the greater the effective value of output voltage becomes.

Hereby, PWM is a system in which input current is intermittently driven for the purpose of "control of output voltage".

PRIOR ART LITERATURE

Patent Literature

[Patent Literature 1] Laid-open patent publication 2007-27009

Non-Patent Literature

[Non-Patent Literature 1] Osamu Ide, "Journal of APPLIED PHYSICS" (U.S.A.), American Institute of Physics, 1 Jun. 1995, Vol. 77, No. 11, p 6015-6020
[Non-Patent Literature 2] Osamu Ide, "NASA/CP2000-210291 Fifth International Symposium on Magnetic Suspension Technology" (U.S.A.), National Aeronautics and Space Administration, July 2000, p 705-719

SUMMARY OF THE INVENTION

Problems to be Solved by the Invention

However, these driving systems of inverter have a problem that the output electric power which can be obtained relative to input electric power is comparatively small, thus efficiency is low.

The present invention has been conceived in view of such circumstances, and the object is to provide an efficient inverter driving system.

Solutions to Problems

The present invention relates to an inverter driving system wherein an inverter is driven using an oscillation circuit which includes a transformer, and a pulsed primary current having a shorter period than a period for the saturation of input waveform is supplied to the transformer.

Further, the pulsed primary current supplied to the above-mentioned transformer is intermittently supplied.

Further, the pulsed primary current supplied to the above-mentioned transformer is intermittently supplied such that the next pulsed primary current is supplied before an output voltage becomes zero, the output voltage occurring on the secondary side caused by a transient phenomenon after the termination of the above-mentioned pulsed primary current which is supplied at any given time.

Advantage of the Invention

The inverter driving system according to the present invention described above, can offer the advantage of efficiently driving an inverter.

BRIEF DESCRIPTION OF THE DRAWINGS

FIG. 2 is a graph illustrating the relationship between current i flowing in the circuit and time t when the switch SW shown in FIG. 1 is switched from off to on.

DESCRIPTIONS OF THE INVENTION

Hereinafter, an embodiment of the present invention is specifically described with reference to the accompanying drawings.

The inverter driving system according to the present invention is a kind of blocking oscillation which became a model for Royer's circuit, wherein the primary driving current of a transformer flows for a very short time, that is, a circuit is driven by pulsed current (spike-shaped current with very narrow pulse width) having a period shorter than a period for the saturation of input waveform, which is a sharp triangular waveform signal having a steep rising and falling curve. In this aspect, the circuit according to the present invention is different from the Royer's circuit in which the input current keeps on flowing continuously.

Hereinafter, the reason why such current is used and the system of the present invention are described.

According to Faraday's law, only the time rate of change in the magnetic flux of a transformer, that is, only the time rate of change in the primary input current is effective for the secondary output voltage of the transformer, and the length of time when current flows does not matter. That is, input current which is flat and close to direct current, has little effect on the output voltage no matter how large it is and how long it flows.

Further, according to non-patent literature 2, the occurrence of positive electromotive force (positive EMF) exceeding Faraday's electromotive force is disclosed, when a change in the primary input current of the transformer involves a precipitous change as effects a change in secondary or more differentiation value with respect to time. The positive electromotive force (positive EMF) is in the same direction as the input current, that is, serving to increase current, and thus the occurrence of the output electromotive force, which exceeds the electromotive force according to the Faraday's law, can be expected.

This is the reason why a sharp spike-shaped current (pulsed current) is used for the primary input signal of the transformer.

Hereinafter, more specific inverter driving system is described.

Figure 1:
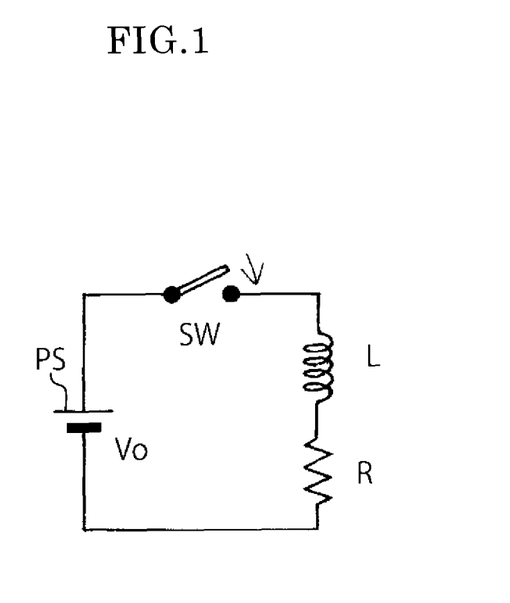
FIG. 1 is a circuit diagram illustrating a circuit configured with a DC power source PS of voltage V0, switch SW and an inductance L having a resistance R.
Figure 2:
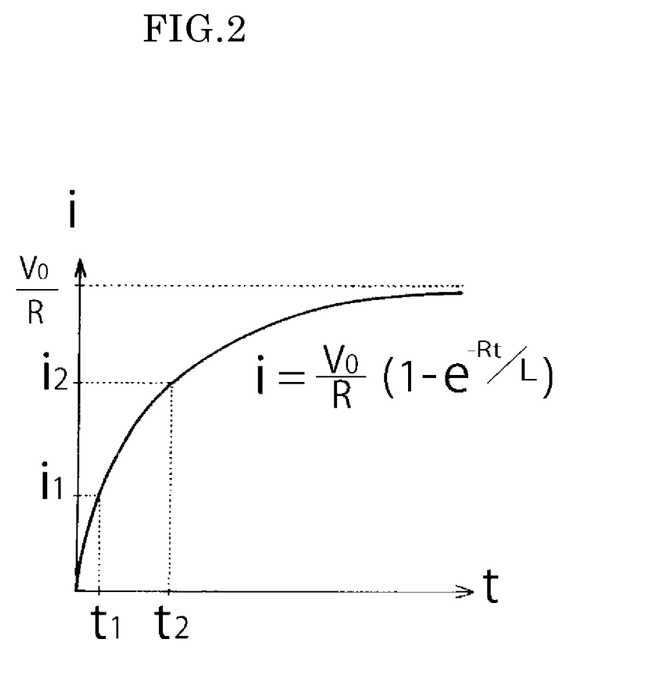

FIG. 1 shows a circuit configured with a DC power source PS of voltage V0, a switch SW and an inductance L having a resistance R, while FIG. 2 shows the relationship between current i flowing in the circuit and time t when the switch SW shown in FIG. 1 is switched from off to on. In this case, the circuit configuration including the resistance R and the inductance L connected in series, corresponds to the equivalent circuit of the primary winding of the transformer.

For example, referring to FIG. 2, a more precipitous time change in current (spike-shaped current) is shown when current is turned off at time t1 (t1<t2) just after the initial rise of current than when current is turned off at time t2 after the input current is turned on at t=0 (the point when the switch SW is switched on from off). That is, by turning off the input current in a shorter period than a period for the saturation of input waveform, the flat portion is prevented from occurring in the input current. Further, when the input current is turned off, current changes in accordance with the function in which the vertical axis of the graph shown in FIG. 2 is reversed, and as a result, a triangular wave having a precipitous grade both in rising and falling curves can be obtained (see relevant part described below).

As such, in the inverter driving system according to the present invention, a precipitous pulse input (pulsed current) can be obtained in the primary winding of the transformer by turning off the input current at the point as closer to t=0 as possible.

Figure 3:
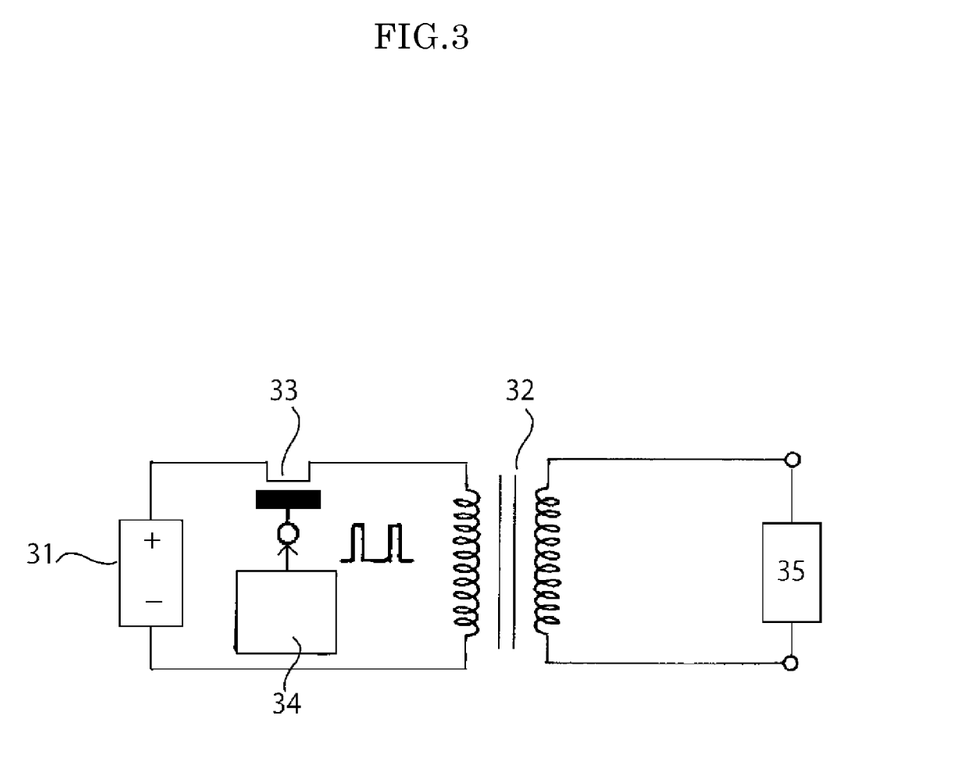
FIG. 3 is a circuit diagram illustrating an inverter driving circuit according to an embodiment of the present invention.

FIG. 3 shows an inverter driving circuit according to an embodiment of the present invention, and the inverter driving circuit is provided with a MOS transistor 33 for supplying the power from a DC power source 31 to the primary winding of a transformer 32, a driving circuit 34 for on/off driving the MOS transistor 33, and a load 35 which is connected to the secondary winding of the transformer 32.

Figure 4:
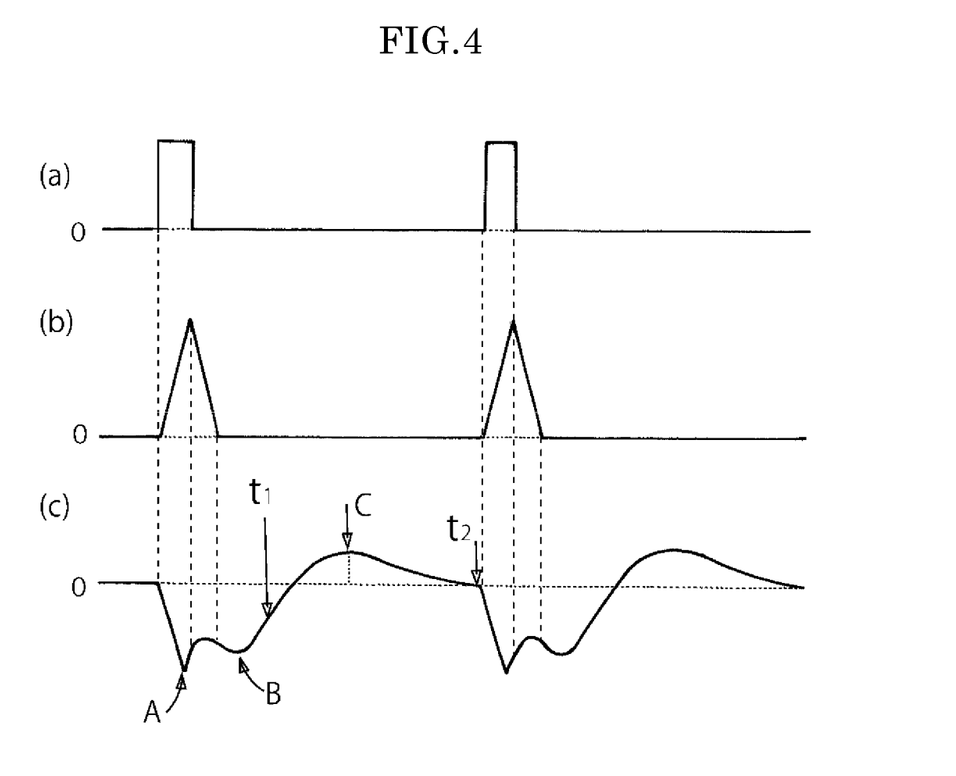
FIG. 4 is a waveform chart illustrating the operation of each part when the inverter driving circuit shown in FIG. 3 is operated.

FIG. 4 shows a waveform chart of each part when the inverter driving circuit shown in FIG. 3 is operated. Here, FIG. 4(a) shows a switching driving waveform of the MOS transistor 33, FIG. 4(b) shows an input current waveform occurring in the primary winding of the transformer 32 and FIG. 4(c) shows an output voltage waveform occurring in the secondary winding of the transformer 32, respectively.

Here, when the MOS transistor 33 is turned on, the current in the primary winding of the transformer 32 is increased by the rising waveform as shown in FIG. 2 such that the supplied current becomes precipitously changing spike-shaped triangular wave as described above, whereby the pulse width for on-driving the MOS transistor 33 becomes very short. As such, when generating a precipitous triangular wave current in the primary winding of the transformer 32, the MOS transistor 33 may be turned on and off by using a pulse which has a very short pulse width.

In this inverter driving circuit, a projecting portion A of the waveform occurring in the secondary output voltage (see FIG. 4(c)) is called a ringing which appears just after the primary current in the transformer 32 (see FIG. 4(a)) is turned on by turning on the MOS transistor 33 using the driving circuit 34. The ringing is usually removed by a filter as noise and is not used for an output, while it is effectively used as an output in the inverter driving system according to the present invention.

Further, the two portions B and C of waveform appears at the positive and negative points in the secondary output of the transformer 32 after the driving circuit 34 turns off the MOS transistor 33 and the primary input current of the transformer 32 is turned off. Such portions B and C are also effectively used for an output in the inverter driving system according to the present invention.

As such, in the inverter driving system according to the present invention, the input current is intermittently supplied to the transformer 32 so as to provide input downtime, whereby the secondary output voltage and current caused by a transient phenomenon during the downtime after the input current becomes zero are proactively used as an output energy. Further, the power of abnormal voltage or so-called ringing noise which transiently occurs just after the input current is turned on, is also used as an output.

In the inverter driving system according to the present invention, the transient abnormal voltage generated upon the turn-on of the primary input current of the transformer 32 and the transient abnormal voltage generated upon the turn-off of the primary input current of the transformer 32 are all effectively used as an output, thereby achieving improvements in energy efficiency of the inverter.

That is, in the inverter driving system according to the present invention, driving intermittent input is for "improvements in energy efficiency", and not for the purpose of "control of output voltage" as in the aforementioned PWM.

Next, another aspect of the inverter driving system according to the present invention is described. That is, the time interval for the primary driving pulse of transformer 32 is shortened, whereby the secondary output voltage due to the transient phenomenon can be enlarged several times while keeping the input power source voltage constant.

Figure 5:
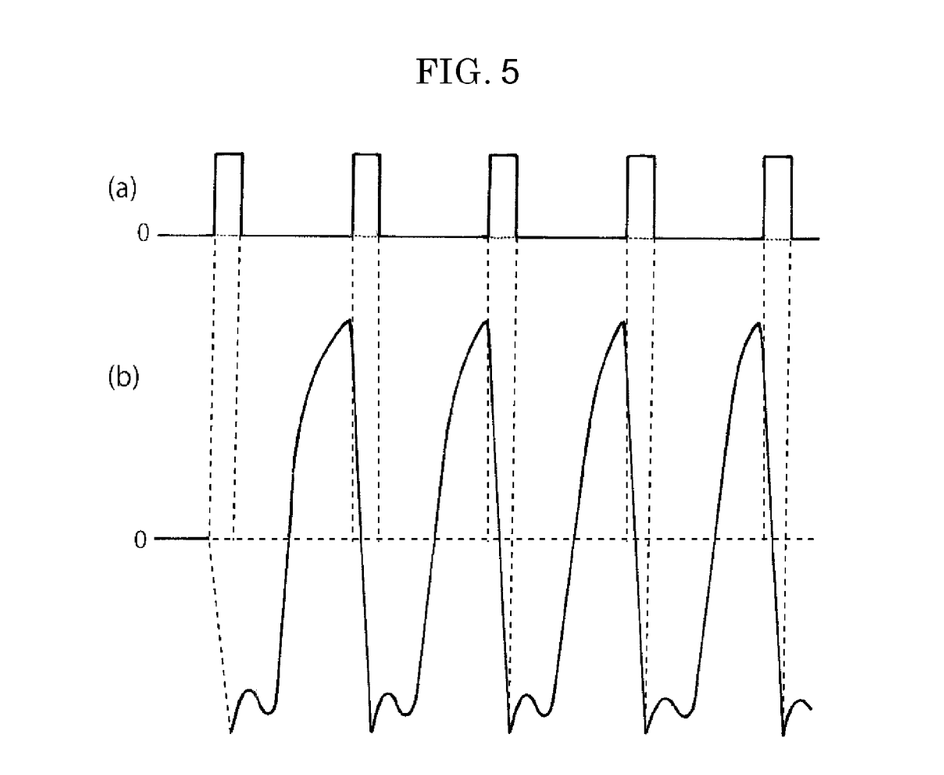
FIG. 5 is a waveform chart illustrating the operation of each part when the time interval of primary driving pulse of the transformer 32 is shortened.

That is, if the time interval for the driving pulse of MOS transistor 33 shown in FIG. 4(a) is shortened as shown in FIG. 5(a), the secondary output voltage of the transformer 32 could be enlarged several times in comparison with the secondary output voltage shown in FIG. 4(c), as shown in FIG. 5(b).

Hereinafter, the reason is described.

Referring to the waveform of the output voltage occurring in the secondary winding of the transformer 32 as shown in FIG. 4(c), a subsequent driving pulse for the MOS transistor 33, which is inputted after an input current is turned off, is assumed to be inputted at time t2 when the output voltage in a reverse direction comes close to zero and is also assumed to be inputted at time t1 when the output current still flows in a reverse direction on the output side.

The next driving pulse for MOS transistor 33 is inputted at time t2 when the output voltage in a forward direction comes close to zero, that is, the next driving pulse for MOS transistor 33 is applied to the MOS transistor 33 at time t2 when the magnetic flux in the core of the transformer 32 comes close to zero. Under the above conditions, the voltage generated in the secondary side of the transformer 32 appears in the form of repeated waveforms as shown in FIG. 4(c). In contrast, if the next driving pulse for the MOS transistor 33 is inputted during a period of time when the secondary output of the transformer 32 occurs in a positive to negative direction, magnetic influx, due to the transient phenomenon of the transformer 32 after the driving pulse of the MOS transistor 33 is driven, that is, under the condition that the secondary output of the transformer 32 exists in the portion from B to C as shown in FIG. 4(c), the time rate of change in magnetic flux is increased upon the input of the next pulse, because the magnetic flux still exists in the transformer 32.

In view of the Faraday's law, yet higher output voltage is generated in a reverse direction. Further, the higher output voltage that occurred at this time has some effect on the output voltage next time when the input pulse is turned off, resulting in yet larger output voltage. That is, another pulsed primary current is intermittently supplied at a time before the output voltage becomes zero, which is generated in the secondary side of the transformer due to the transient phenomenon caused by a pulsed primary current supplied to the transformer, whereby the secondary output voltage of the transformer can be yet enlarged.

As such, booster effects due to transient phenomenon is continuously multiplied, causing "avalanche" like phenomenon to occur, whereby a large output voltage can be obtained from the secondary winding of the transformer.

Further, in view of the non-patent literature 2, it can be assumed that the component of positive electromotive force (positive EMF) yet pushes up the output voltage in accordance with a change in the magnetic flux involving a change in current with secondary or more differentiation with respect to time in the process described above.

On this account, according to the inverter driving system of the present invention, the efficiency of inverter could be significantly improved.

Figure 6:
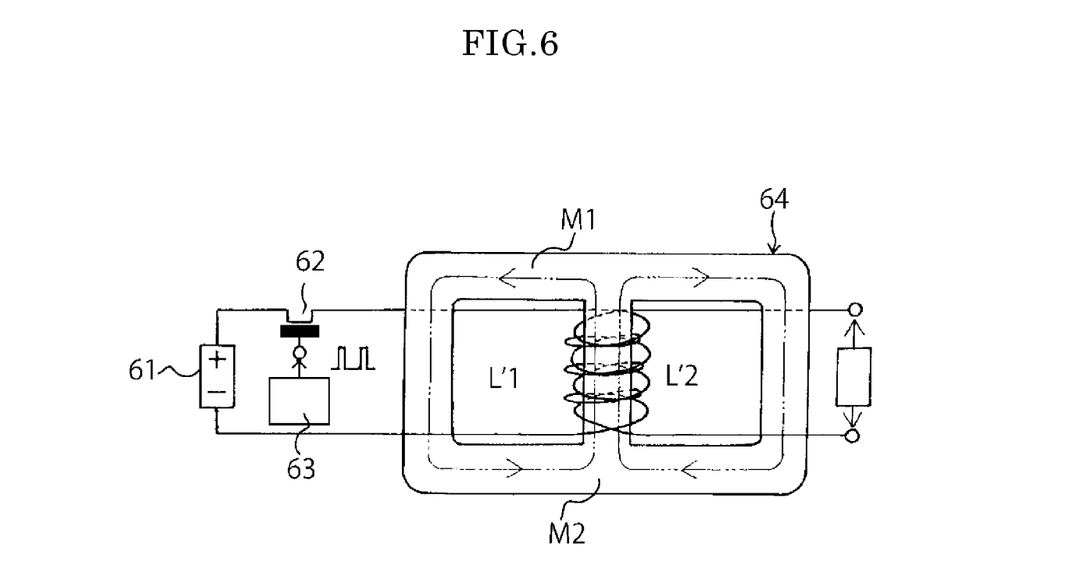
FIG. 6 is a circuit diagram illustrating an embodiment when using a usual transformer.

Next, an example of inverter device is shown in FIG. 6, which is suitable for applying the inverter driving system according to the present invention described above.

In FIG. 6, disclosed are a DC power source 61, a MOS transistor 62 used as a switch for supplying a power from the DC power source 61 to the primary winding $L'_1$ of a transformer 64, a driving signal generating circuit 63 for on-off driving the MOS transistor 62, an I-type core $M_1$ for the transformer 64, an E-type core $M_2$ for the transformer 64, a primary winding $L'_1$ of the transformer 64, and a secondary winding $L'_2$ of the transformer 64.

In this embodiment, the driving circuit 63 shortens the time interval of the primary driving pulses of the transformer 64 as shown in the driven waveform shown in FIG. 5(a), and drives the MOS transistor 62 such that the next primary driving pulse is inputted while magnetic flux in a reverse direction still exists in the transformer 64, whereby an output voltage as shown in FIG. 5(b) can be obtained from the secondary winding $L'_2$ of the transformer 64.

Figure 7:
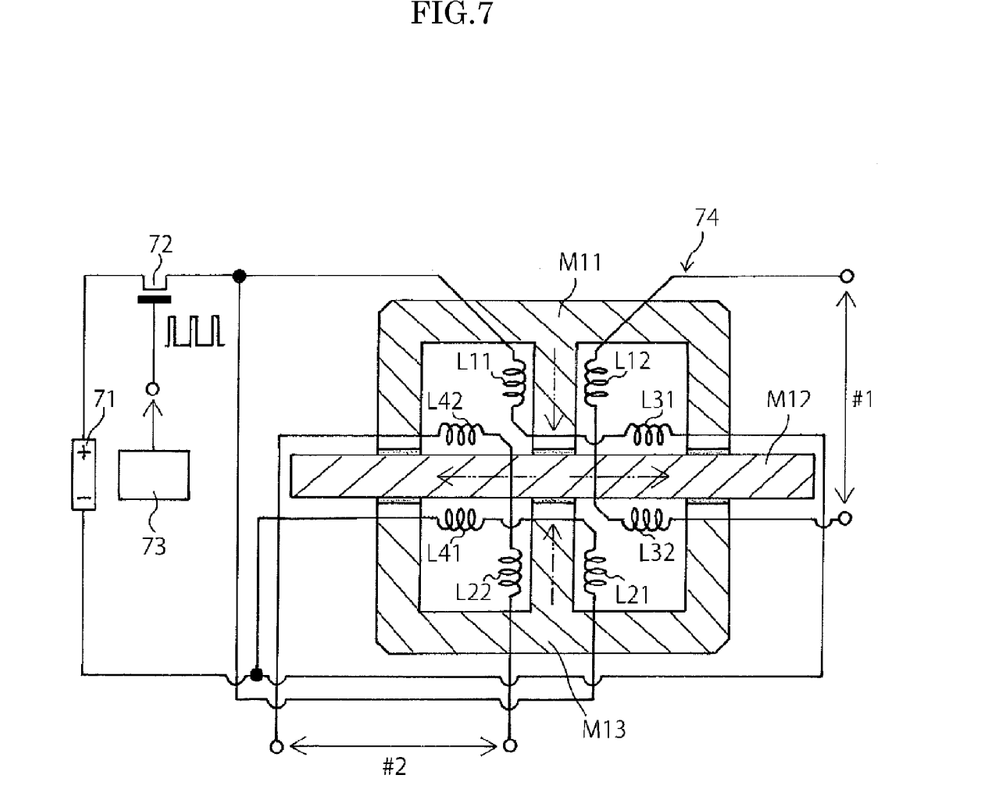
FIG. 7 is a circuit diagram illustrating an embodiment when using a transformer having a repulsive magnetic field therein.

Further FIG. 7 shows another example of inverter device which is suitable for applying the inverter driving system according to the present invention described above. FIG. 7 shows an embodiment which uses a transformer having a repulsive magnetic field therein, providing two output terminals.

In FIG. 7, disclosed are a DC power source 71, a MOS transistor 72 as a switch for supplying a power from the DC power source 71 to the coil $L_{11}$, $L_{21}$, $L_{31}$, $L_{41}$ which are the primary winding of a transformer 74, a driving signal generating circuit 73 for on-off driving the MOS transistor 72, E-type cores $M_{11}$, $M_{13}$ of the transformer 74, an I-type core $M_{12}$ of the transformer 74, the primary windings $L_{11}$, $L_{21}$, $L_{31}$, $L_{41}$ of the transformer 74, and the secondary windings $L_{12}$, $L_{22}$, $L_{32}$, $L_{42}$ of the transformer 74.

Here, the length of I-type core $M_{12}$ is greater than the width of E-type core $M_{11}$, $M_{13}$, and both ends of I-type core $M_{12}$ are configured to project from the E-type cores $M_{11}$, $M_{13}$, while the E-type cores $M_{11}$, $M_{13}$ and I-type core $M_{12}$ are arranged with a given air gap without coming into contact each other. Further, the center core part of E-type core $M_{11}$ and the center core part of E-type core $M_{13}$ are oppositely arranged by sandwiching the I-type core $M_{12}$ such that the magnetic fields in a part of cores where the E-type core $M_{11}$ and the E-type core $M_{13}$ face each other are directed oppositely each other, and a repulsive magnetic field is generated in this part as shown in the cores by dotted line with arrows.

In this embodiment, the driving circuit 73 drives the MOS transistor 72 with a driving waveform as shown in FIG. 5(a), and thus output voltages as shown in FIG. 5(b) can be obtained from two output terminals #1, #2 of the transformer 74 respectively.

The driving circuit is configured to directly drive the MOS transistor in each of the aforementioned embodiments; however, the driving circuit can be also configured so as not to directly drive the MOS transistor by interposing a circuit element such as a photo-interrupter between the driving circuit and the MOS transistor.

Moreover, the configuration and variation of each embodiment which have been described can be properly combined and applied as long as they are harmonized.

INDUSTRIAL APPLICABILITY

The present invention as described above can be applied in a similar manner to any circuit configuration of inverter as long as it uses an oscillation circuit with a transformer.

EXPLANATION OF SYMBOL 1, 32 - - - transformer
2, 31, PS, 61 - - - DC power source
SW, SW1, SW2 - - - switch
33, 62 - - - MOS transistor
34, 63 - - - driving circuit
$M_1$, $M_{11}$, $M_{13}$ - - - E-type core
$M_2$, $M_{12}$ - - - I-type core
$L'_1$, $L_{11}$, $L_{21}$, $L_{31}$, $L_{41}$ - - - primary winding
$L'_2$, $L_{12}$, $L_{22}$, $L_{32}$, $L_{42}$ - - - secondary winding

The invention claimed is:

1. An inverter driving system for driving an inverter using an oscillation circuit with a transformer, wherein
a circuit is formed such that when an on/off pulsed current is supplied on the primary side of a transformer, a voltage waveform with two sequentially-arranged positive-negative inverted peaks appears on the secondary side of the transformer, and the on/off pulsed current is intermittently supplied on the primary side of said transformer while the on-time of the supplied current is adjusted within a period of time from the pre-inverted peak to the post-inverted peak, whereby a voltage having a waveform with two sequentially-arranged positive-negative inverted and amplified peaks is outputted from the secondary side of the transformer and the outputted voltage is utilized.

2. The inverter driving system according to claim 1, wherein the on-time of said supplied current is adjusted within a period of time in the pre-amplified voltage waveform from the pre-inverted peak to the time before the value of the voltage waveform becomes zero at the time of the positive-negative inversion.

3. An inverter driving system for driving an inverter using an oscillation circuit with a transformer, wherein a circuit is formed such that when an on/off pulsed current is supplied on the primary side of a transformer, a voltage waveform with two sequentially-arranged peaks and a single positive-negative inverted peak subsequent to the two peaks appears on the secondary side of the transformer, and the on/off pulsed current is intermittently supplied on the primary side of said transformer while the on-time of the supplied current is adjusted within a period of time from the pre-inverted peak to the post-inverted peak, whereby a voltage having a waveform with two sequentially-arranged and amplified peaks and a single positive-negative inverted and amplified peak subsequent to the two peaks is outputted from the secondary side of the transformer and the outputted voltage is utilized.

4. The inverter driving system according to claim 3, wherein the on-time of said supplied current is adjusted within a period of time in the pre-amplified voltage waveform from the pre-inverted peak to the time before the value of the voltage waveform becomes zero at the time of the positive-negative inversion.

5. The inverter driving system according to claim 4, wherein said supplied current has a spike-shaped waveform with both precipitous rising and falling slopes and turns off in a shorter time than the input waveform is saturated.

6. The inverter driving system accordingly to claim 5, further comprising a MOS transistor for turning on and off said supplied current and a drive circuit for on-off driving the MOS transistor with a drive pulse, wherein the time interval of each drive pulse is formed shorter than the time interval between sequentially adjoining drive pulses.

* * * * *